US008516308B1

(12) United States Patent
Gill et al.

(10) Patent No.: US 8,516,308 B1
(45) Date of Patent: Aug. 20, 2013

(54) CRASH BASED INCOMPATIBILITY PREDICTION FOR CLASSES OF MOBILE DEVICES CRASH DATA

(75) Inventors: Sunbir Gill, Irvine, CA (US); Kenley B. Capps, Irvine, CA (US); David R. Sodt, Seattle, WA (US); Mekka C. Okereke, Irvine, CA (US); Matthew A. Jones, Ladera Ranch, CA (US)

(73) Assignee: Amazon Technologies, Inc., Reno, NV (US)

( * ) Notice: Subject to any disclaimer, the term of this patent is extended or adjusted under 35 U.S.C. 154(b) by 340 days.

(21) Appl. No.: 13/044,483

(22) Filed: Mar. 9, 2011

(51) Int. Cl.
*G06F 11/00* (2006.01)

(52) U.S. Cl.
USPC ............ 714/38.1; 714/26; 717/174; 717/176; 717/178

(58) Field of Classification Search
USPC ................... 714/26, 38.1; 717/174, 176, 178
See application file for complete search history.

(56) References Cited

U.S. PATENT DOCUMENTS

| 7,065,783 | B2 | 6/2006 | Rygaard |
| 7,275,243 | B2* | 9/2007 | Gibbons et al. ............... 717/159 |
| 7,284,190 | B2 | 10/2007 | Chellis et al. |
| 7,519,656 | B2 | 4/2009 | Yamaguchi et al. |
| 7,847,840 | B2 | 12/2010 | DeLuca et al. |
| 8,381,189 | B2* | 2/2013 | Surazski et al. ............... 717/125 |
| 2004/0034853 | A1* | 2/2004 | Gibbons et al. ............... 717/174 |
| 2004/0093595 | A1* | 5/2004 | Bilange ........................ 717/171 |
| 2006/0179079 | A1* | 8/2006 | Kolehmainen ............. 707/104.1 |
| 2007/0061243 | A1 | 3/2007 | Ramer et al. |
| 2008/0263406 | A1 | 10/2008 | Prescott et al. |
| 2009/0235284 | A1 | 9/2009 | Steventon et al. |
| 2010/0122351 | A1* | 5/2010 | Lloyd et al. ..................... 726/29 |
| 2010/0162231 | A1* | 6/2010 | Lanchares et al. ............ 717/177 |
| 2010/0262953 | A1* | 10/2010 | Barboni et al. ............... 717/120 |
| 2010/0262959 | A1* | 10/2010 | Bruno et al. .................. 717/171 |
| 2010/0287048 | A1 | 11/2010 | Ramer et al. |
| 2011/0093773 | A1 | 4/2011 | Yee |
| 2011/0202966 | A1* | 8/2011 | Gupta et al. .................. 725/114 |
| 2011/0314438 | A1* | 12/2011 | Surazski et al. .............. 717/100 |
| 2012/0129503 | A1* | 5/2012 | Lindeman et al. ......... 455/414.1 |

OTHER PUBLICATIONS

AMAZON.COM, compatible detection feature, online catalog, available since at least 2010.

* cited by examiner

*Primary Examiner* — Charles Ehne
(74) *Attorney, Agent, or Firm* — Knobbe, Martens, Olson & Bear, LLP

(57) ABSTRACT

A network application system provides mobile devices with personalized recommendations of applications based at least in part on the device resources of the mobile devices. Device resources may be detected through an interrogation process performed on the mobile device by a mobile application store client, and/or may be determined based on metadata information contained in a photograph file taken by the mobile device and transmitted to the network application system. The network application system gathers crash data based on incidences of applications crashing on mobile devices in order to detect incompatibilities between applications and device resources. The system may then update application requirements data so that users are not presented with applications likely to crash on their mobile devices. The system may also inform an application's developer of a detected incompatibility so that a new, compatible version may quickly be available to users.

26 Claims, 10 Drawing Sheets

1: Photo or metadata
2: Model lookup
3: Mobile client application with interrogation code
4: Interrogate
5: Interrogation results
6: Store request
7: Personalized application compatibility matching
8: Compatible application purchase options
9: Application purchase request
10: Application
11: Run Application
12: Crash report
13: Compatibility data update

CRASH BASED INCOMPATIBILITY PREDICTION FOR CLASSES OF MOBILE DEVICES CRASH DATA

BACKGROUND

Mobile devices, such as smart phones and tablets, are becoming increasingly popular. These come in a variety of models with varying operating systems, mobile carriers, and hardware and software resources. As mobile devices become more popular, there is a growing demand for applications to use on them. An application may require that a mobile device has certain resources necessary to properly run the application. For example, a specific operating system, a minimum version of that operating system, a touch-sensitive screen, an accelerometer, and/or other resources may be the minimum necessary to properly run a given application.

To help users to find and download applications for their mobile devices, companies have provided mobile application stores. These mobile application stores are often accessed from a mobile device connected to a network, and present a user with applications available for purchase and/or download. It may be advantageous to avoid presenting users with the ability to purchase and/or download an application which is incompatible with the user's mobile device. If the number of different models of mobile devices is relatively small, it may be feasible to maintain a comprehensive list of approved or unapproved mobile devices for a particular application. However, as the number and variety of different models of mobile devices grow, and the rate at which new models released increases, such list-based compatibility approaches become more burdensome and less accurate. This may be further complicated by users changing the resources on their mobile devices, such as upgrading the operating system version, or changing the mobile carrier through which their mobile devices accesses a network.

A new version of a popular mobile operating system may cause an application which ran stably under the prior version to crash on the new version. Detecting a correlation between mobile devices' use of the new operating system version, and the increased rate at which the application crashes those mobile devices may be able to avoid user frustration and speed up a response from the application's developer.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION OF SPECIFIC EMBODIMENTS

Figure 1:
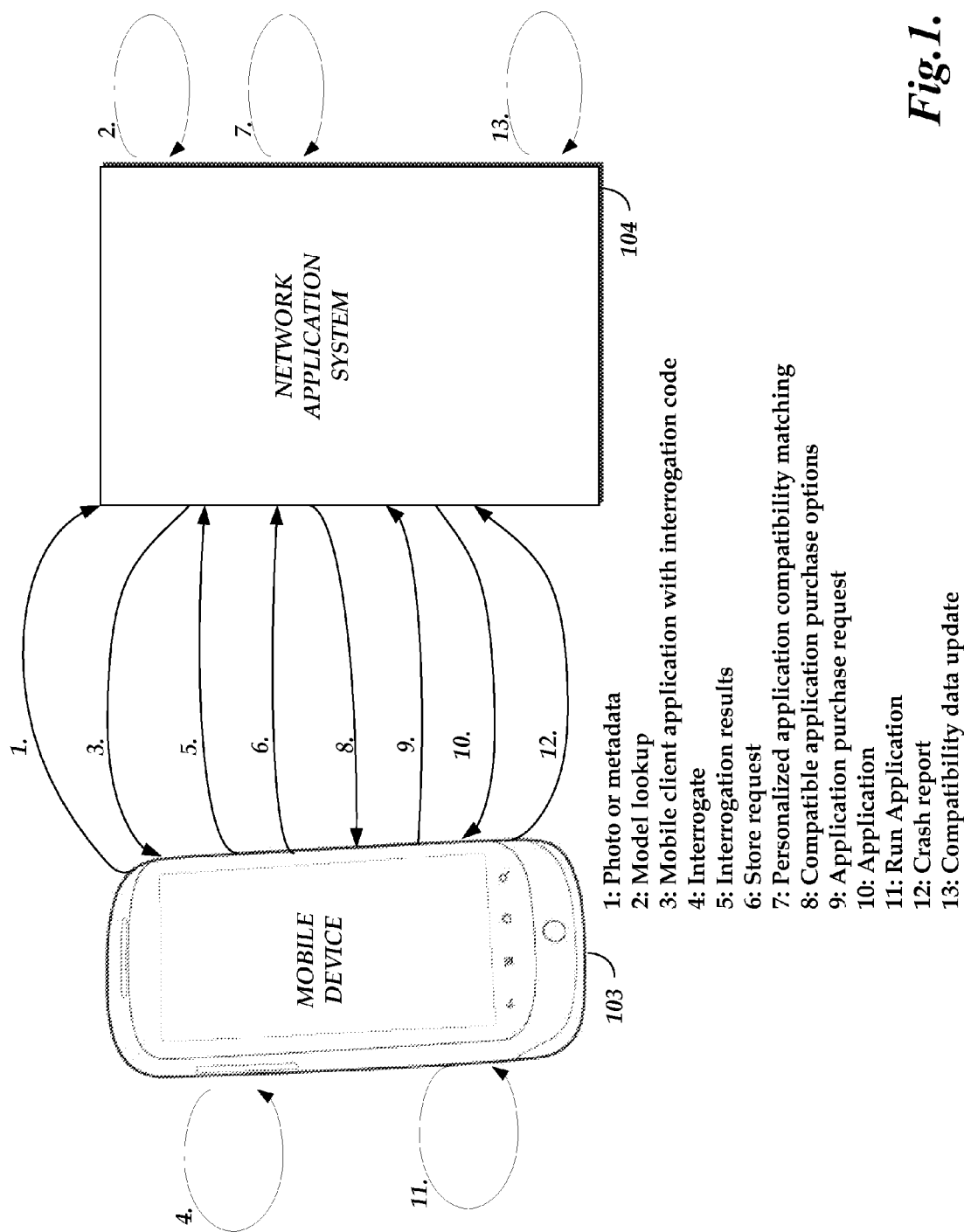
FIG. 1 illustrates a series of interactions between a mobile device and a network application system, where applications are presented based on compatibility with the mobile device's resources. As explained below, some of the interactions and steps shown in FIG. 1 are only performed in certain use case scenarios and embodiments.

FIG. 1 illustrates one embodiment of a system and method in which a network application system 104 assists a user of mobile device 103 in obtaining applications compatible with the mobile device, based on the mobile device's resources. The network application system 104 may is associated with an electronic storefront through which users may browse, search for, view descriptions of, purchase, and download mobile applications. A mobile client application with interrogation code is used on the user's mobile device 103 in order to interrogate the mobile device. Different mobile devices may require different versions of the mobile client application (for example, due to operating system compatibility issues), so an initial determination step may optionally be performed. In event 1, the mobile device 103 sends a photograph file 1 to the network application system 104. This may be accomplished by prompting the user, via a user interface of the network application system 104, to take a photo with the mobile device, and to text or email the photo to a particular number or address. In event 2, the network application system 104 extracts metadata from the photograph file to determine the mobile device's model, and performs a model lookup to determine the expected resources of the mobile device 103 based on its model. In event 3, the network application system 104 provides the mobile client 103 with a compatible mobile client application, such as an "app. store" application that provides functionality for a user to purchase applications from an app. store of the network application system. The mobile client application may include interrogation code for subsequently interrogating the mobile device. Although not depicted in FIG. 1, the model number may be communicated to the user, such as via display page transmitted to the mobile device 103. In embodiments in which the network application system 104 only supports a particular class of mobile devices (e.g., Android devices), events 1 and 2 are preferably omitted, and a "one size fits all" mobile client application is provided to the mobile device in event 3.

In event 4, the mobile client application runs the interrogation code on the mobile device 103 to interrogate the mobile device's specific resources. This may provide information specific to the particular mobile devices, which may be different than those commonly associated with the mobile device's model number (for example, the user may have upgraded the version of the operating system, or moved to a different mobile carrier). In event 5, the mobile device 103 reports the mobile device's resources, determined through the interrogation, to the network application system 104. The network application system 104 may record this information, in addition to the mobile device's model number, in association with a preexisting account of the user with the app store. The network application system 104 has access to application requirements data, which defines, for each application, the minimum resources needed by a mobile device 103 to properly run that application. In event 6, the mobile device 103 sends a store request, such as a request for an app store page, to the network application system 104. In event 7, the network application performs personalized application compatibility matching, although in some embodiments such matching is performed before a store request is received. This personalized application compatibility matching compares the mobile device's resources to the resources required by applications in order to determine which applications are compatible with the mobile device 103. In event 8, the user is presented with application store pages that indicate or reflect the compatibility of the available applications with the user's mobile device (s). Such personalization of application store pages may also be performed when the user accesses the store from a non-mobile device such as a personal computer. In event 9, the mobile device 103 sends an application purchase request, although other requests may be for free applications which do not require purchase. In event 10, the mobile device 103 receives the application from the network system application's app store.

The sample scenario of FIG. 1 also illustrates the system's ability to improve compatibility data through crash detection. The mobile device 103 runs the application 11 obtained from the network application system and, if the application crashes, the mobile client application on the mobile device 103 detects the crash. Information concerning the crash is sent to the network application system 104 in a crash report 12. The network application system 104 aggregates and analyzes crash reports received from many mobile devices. The system is capable of detecting correlations between resources and higher incidences of an application crashing. For example, a newly released version of a particular operating system may cause an application which was stable on the prior version to frequently crash. Unchecked, this could cause significant user frustration, resulting in affected users leaving negative reviews for the application. This could damage the reputations of the application and its developer—despite the fact that the application may have thoroughly tested for stability at the time of its release. In one embodiment, the system 104 significantly reduces frustration by updating application requirement data in response to the detected crash correlation. Application requirements data may describe mobile device resources which are required, recommended, or otherwise associated with running a mobile application. This update may prevent the application from being available to other users whose device resources would suggest an unacceptably high likelihood of instability. Once the network application system 104 detects the crash correlation, it may also inform the application's developer and/or publisher, for example by email. This quick, automated alert of a detected incompatibility allows the developer to promptly create a new version of the application which resolves the incompatibility for the newly released operating system version. In another embodiment, the system may inform users who have previously download the application, such as those users whose devices are likely incompatible with the application, of the detected incompatibility.

Figure 2:
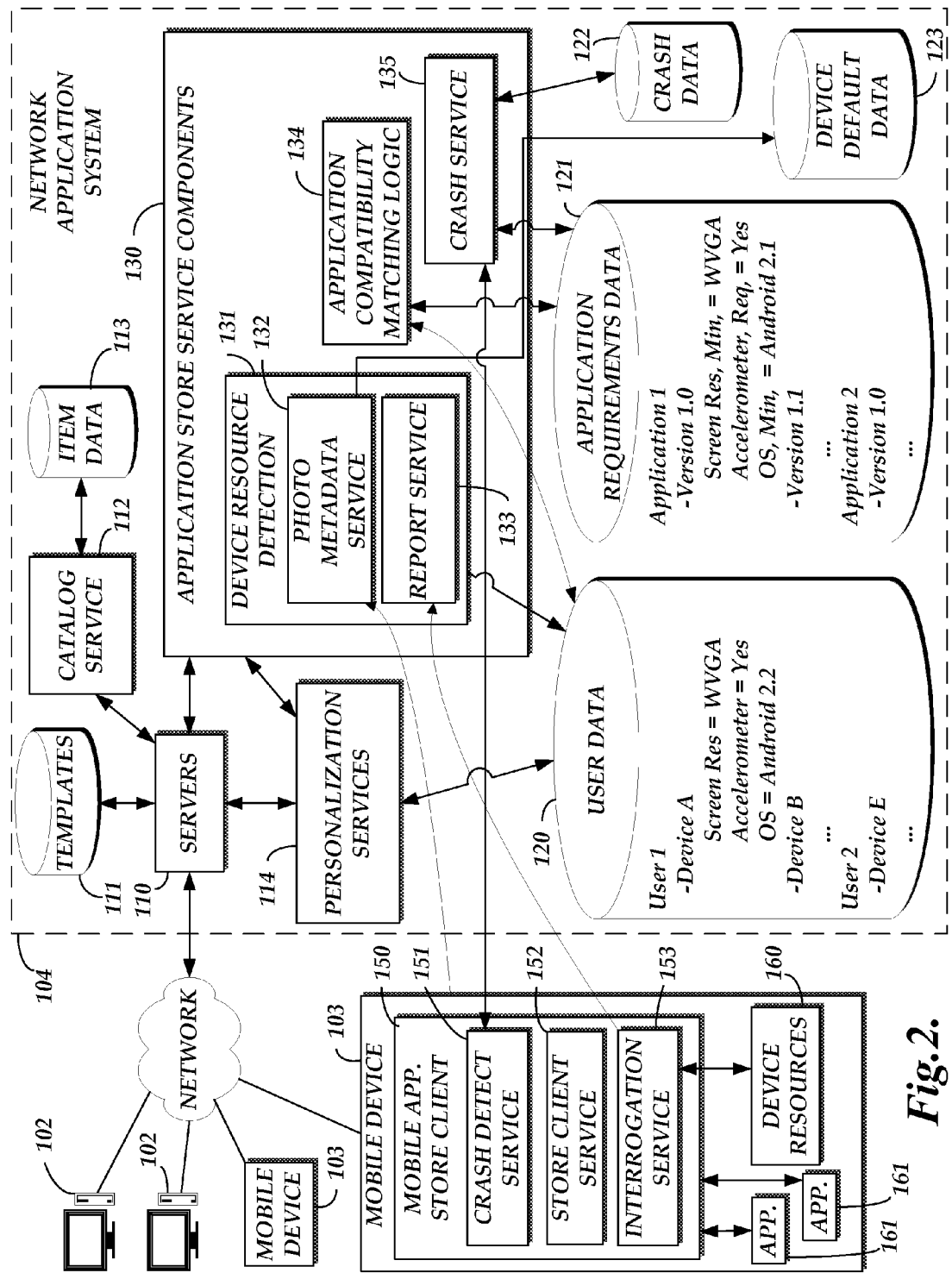
FIG. 2 depicts one embodiment of a system capable of providing applications based on compatibility with a mobile device's resources, and updating compatibility information based on observed application crashes on mobile devices.

Referring to FIG. 2, an embodiment of the system is described in greater detail by addressing particular components which may be used within the system. The described embodiment includes a network application system 104 which is accessible through a network. User systems 102, such as general purpose computers, access the network application system 104 through the network and communicate with servers 110 within the network application system 104. In one embodiment, the servers 104 include web servers which provide network resources to the user systems 102. For example, such network resources may include web pages providing users access to an electronic catalog through which they can purchase items, including mobile applications. The electronic catalog may additionally or alternatively allow users to rent or lease items, such as music or movies, bid on auction items, and perform various other types of catalog-related tasks. The servers 110 are in communication with a catalog service 112 which provides information concerning items available through the electronic catalog. Such information may be stored in a database for item data 113, and may include, for example, item descriptions, item prices, item specifications, item availability, the identity of an item's author, manufacturer, developer, or publisher, and/or other information relevant to such items. Items offered by the network application system 104 and represented by the item data 113 may include applications designed for use with mobile devices.

Applications may include a variety of types and packages of code executable on or accessible from a mobile device, such as programs which may be installed and/or run on a mobile device, applets, applications designed to be accessed through network browsers (such as web-based HTML5 or Flash applications). Such applications can be created using a variety of programming languages, such as Java, Javascript, HTML, XML, CSS, Ruby, C, C++, C#, Visual Basic, Pascal, Object Pascal, ActionScript, XHTML, WML, and any combination thereof. In some embodiments, applications are categorized according to general functionality, such as navigation, games, multimedia, other entertainment, system utilities, communication, social networking, travel, etc.

A user of a user system 102 may request from a server 110 to view an application's information. In this embodiment, the server 110 queries the catalog service 112 which retrieves item data 113 related to the application. The server 110 is also in communication with templates data 111 which provides predefined formats for presenting item data to users. The server formats the retrieved item data according to at least one selected template and transmits the resource to the user system 102.

In some embodiments, mobile devices 103 are a particular type of user system 102. Mobile devices 103 may include mobile phones, tablets, slate computers, netbooks, laptops, personal digital assistants and/or any of a number of other categories of electronic devices. For example, recent advances in consumer electronics include operating systems, associated with mobile devices and their applications, embedded in a variety of devices, including televisions, media devices, printers, cameras, in-car entertainment and control systems, audio/visual control systems, and other embedded computing systems. Some such devices may act as mobile devices in certain embodiments. Furthermore, the methods and systems described herein can also be applied to other categories of devices, including general purpose computers.

The network application system 104 may include the ability to provide personalized information to different users, user systems 102, and/or mobile devices 103. Such personalization may be performed by personalization services 114 in communication with the network application system's servers 110. Examples of personalization include personalized recommendations, personalized search results, and personalized browsing of the applications available through the network application system 104. Personalization may be based on compatibility between the resources of one or more of a user's mobile devices, and the resources required or recommended by a mobile application. The type of personalization performed may depend upon the type of computing device used to access the application store. For example, suppose a user registers two mobile devices (have different capabilities) with the application store, via the process of FIG. 1 or some other method. If this user subsequently browses the store with a PC, the system 104 may personalize pages of the application store to indicate or reflect the compatibility of the available applications with both of these mobile devices (see, e.g., FIGS. 3-5). If, on the other hand, the system 104 detects that the user is browsing the store with one of these two mobile devices, the system may personalize pages of the application store to indicate or reflect the compatibility of the applications with that particular mobile device only.

Any of a variety of mobile device capabilities and resources may be considered in determining device-application compatibility, and in personalizing the application store accordingly. The following are examples: the mobile device's operating system (such as Google's Android, Apple's iOS, Microsoft's Windows Phone, Research in Motion's Blackberry OS, Hewlett-Packard/Palm's webOS, Nokia's Symbian, Hewlett-Packard/Palm's Palm OS, or other operating systems), the particular version of the operating system, the cellular carrier which the mobile device uses, the central processing unit, graphical processing unit, quantity of random access memory, data storage capacity, display resolution, display density, display color range, display size, and/or presence of a number of other resources such as a touch-sensitive screen, virtual keyboard, physical keyboard, trackball, D-pad, microphone, speaker, Bluetooth radio, 802.11a/b/g/n radio, infrared port, display output, headphone output, particular device driver, software library, application, or other hardware or software resource which may be present on or available to the mobile device.

The network application system 104 may include application store service components 130 which provide services designed to improve the ways in which the network application system offers users applications for their mobile devices. An example of such application store service components 130 is application compatibility matching logic 134. In one embodiment, application compatibility matching logic analyzes the minimum requirements for an application, stored as application requirements data 121, and compares it against the resources associated with a mobile device, stored as user data 120. Application requirements data 121 may be stored in a variety of formats and structures, as will be described in greater detail later. For the present example, assume "Application 1" has three resource requirements for a mobile device to properly run it: a screen resolution of at least 800 horizontal pixels and 480 vertical pixels (commonly referred to as 800× 480, or "WVGA" resolution), an accelerometer, and at least version 2.1 of the Android operating system. User data 120 may reflect that a user, User 1, is associated with a mobile device, Device A, which has a WVGA screen resolution, an accelerometer, and Android version 2.2 as its operating system. The application compatibility matching logic 134 verifies that each of Application 1's requirements is met by Device A, and confirms that Device A is compatible with Application 1.

The above described example describes one use of requirement data, user data, and application compatibility logic. In another example, data structures related to application requirements may represent a particular set of requirements as a tree of logical operations. This tree can be represented as having a root requirement nodes, and sub-nodes. It may also be represented by linking requirements through "AND" and "OR" operations, such as: A AND (B OR C). In another embodiment, application requirements data includes requirements data specific to different versions of an application, so that version 1.0 may have different requirements than version 1.1.

Alternatively or additionally, an application, or a version of that application, may have multiple sets of application requirements data. For example, one set may define the resources required for a mobile device to be considered compatible with the application, while another set of application requirements data defines the resources for a mobile device to be optimized for the application. A mobile device with a display resolution greater than the native resolution of an application may be capable of displaying the application— for example, by displaying it in a portion of the device's display, or by stretching/upscaling the application's resolution to meet the device's resolution; however such a solution may result in a non-optimal experience with the application. Accordingly, a mobile device which matches the application's native resolution may be considered optimal, while a mobile device with a resolution which exceeds the application's resolution may only be compatible. In other examples, a mobile device with a resolution less than the application's resolution may be capable of down-scaling the application's resolution, also resulting in a compatible but non-optimal way of running the application.

Another embodiment of the application compatibility matching logic 134 provides a non-Boolean evaluation of compatibility between a mobile device and an application. Instead of, or in addition to, determining whether the mobile device is compatible with the application, the application compatibility matching logic 134 may determine or predict the degree of compatibility between the two. For example, the application compatibility matching logic may calculate a compatibility score for the mobile device based on the application's requirements data. The compatibility score may, for instance, be calculated by beginning with a compatibility score of 0 and adding and/or removing points based on the mobile device's resources. A 600 megahertz processor could add 20 points to the compatibility score while an 800 megahertz processor would add 30 points and a dual-core, 1 gigahertz processor would add 50 points. Having a touch-sensitive screen could add 30 points, but lacking multi-touch functionality could remove 10 points. Other application compatibility matching logic approaches, such as alternate scoring methods, and compatibility classifications other than "compatible" "incompatible" and "optimized" may be used. In another embodiment, a combination Boolean evaluations and non-Boolean evaluations are used. For example, a set of requirements data may strictly require certain device resources, such that a device is considered if it lacks them, and may have other device resources which affect the degree of compatibility.

User data 120 may associate one or more mobile devices with a user account. Alternately, a mobile device may be associated with a temporary user identification rather than a preexisting account. For example, a temporary user identification may be used if a device's resources are detected and stored only for the duration of that user's session and the user is not associated with a registered account. In the illustrated embodiment, user data 120 is obtained through a report service 133 in communication with an interrogation service which is part of a mobile application store client 150 running on a mobile device 103. The mobile application store client 150 may be installed on a mobile device 103 to provide the mobile device's user a way of interacting with the network application system 104 in order to obtain applications for the mobile device 103. That storefront functionality may be provided through a mobile store client service 152, which may allow the user to browse through applications, search for applications, read reviews and details of applications, and obtain personalized recommendations of applications, based on personalization methods performed by the network application system's personalization services 114. Applications may be available to users for purchase, for free, for rent, for trial use, and/or on some other basis. The network application system may store account information associated with the user, such as payment information, which assists with the process of purchasing applications for the mobile device.

Applications may be submitted to the system 104 by developers and/or publishers, and the system 104 may split the revenue from an application's sale with the application's developer and/or publisher. The store client service 152 may function as an alternate way of interacting with the network application system 104, since the network application system 104 may also be accessible through other means, such as through a web browser installed on a user system 102. The store client service 152 may interact with the network application system 104 over a network and may connect to a server 110, which may be a web server, or some other server which may be specialized for interactions with mobile application store clients 150. For example, a server 110 serving mobile application store clients 150 may use the Hypertext Transfer Protocol and listen on a port commonly associated with that protocol (such as ports 8080, or 80), and/or may use some other protocol or port number.

In the embodiment illustrated by FIG. 2, the mobile application store client 150 includes an interrogation service 153. The interrogation service 153 performs an interrogation of the mobile device's, such as by interrogating the mobile device's resources directly and/or indirectly. Such an interrogation may take place when the mobile application store client 150 is first installed on the mobile device, 103, at intervals following installation, at the user's direction, in the background without requiring user initiation, and/or any combination thereof. An interrogation performed by the interrogation service 153 may seek to determine the resources present on or available to the mobile device 103 at the time of the interrogation. For example, the interrogation service 153 may check registry values, system information settings, and/or may attempt function calls associated with specific resources in order to determine whether such resources are present on the mobile device. These interrogations may involve direct interaction with device resources 160, or may include system setting lookups to reveal the presence of such device resources 160. In one embodiment, a series of interrogation steps are taken for each of a group of possible resources which the interrogation service 153 attempts to detect and identify. The interrogation service expects that some of the interrogation requests may attempt to access non-existent device resources 160, and is designed to handle errors and/or exceptions which may be caused by such attempts. In some embodiments, the interrogation service 153 may also perform a benchmark test which may indicate a cumulative performance value of the mobile device 103. In some embodiments, the interrogation service may be part of an applet, a script, a plug-in and/or an application, and may be accessed through a webpage of the network application system 104.

Results from the interrogation may be provided by the interrogation service 153 to a report service 133 which is part of the application store service components 130 which make up the network application system 104. The results may be in the form of an interrogation report, which may, for example, be formatted using a markup language such as XML and transferred over a network using TCP/IP to the report service 133. In the one embodiment, the mobile application store client 150 is designed to cache the interrogation report in the event that the mobile device is not able to connect to the network application system when the report is first ready for transmission. The mobile application store client 150 may then later transmit the interrogation report to the network application system 104 at a later time.

The report service 133 may update user data 120 in response to receiving the interrogation report from the interrogation service 153. The report service 133 may add data for a mobile device 103 for which the system 104 previously lacked resource data for. The report service 133 may also add new data and/or replace old data associated with a mobile device. In another embodiment, the report service maintains information reflecting what resource data the mobile device 103 previously had, while updating the user data to reflect what resources the mobile device 103 had at the time of the most recent interrogation. This can provide information showing the how the resources of a mobile device 103 have changed over time. Such information may be useful for analysis, especially when aggregated and analyzed for statistical trends amongst a group of mobile devices. In other embodiments, the report service 133 sends a request to the mobile device's interrogation service 153 to initiate an interrogation of the mobile device's resources 160. An interrogation may be partial, supplemental, and/or comprehensive.

In the illustrated embodiment of FIG. 2, the application store service components 130 include a photo metadata service 132 as part of its device resource detection services 131. This service 132 may be omitted in some embodiments, or may be provided but invoked only in certain device-identification scenarios. The photo metadata service 132 is capable of detecting a some of the mobile device's resources, such as the mobile device's make and model, based on a photograph file taken by the mobile device 103. The system may request that the user takes a photograph with their mobile device and submit the photograph. It may be mentioned that the photograph can be of anything, as its actual photo contents are unimportant for purposes of capability detection. In one embodiment, the user is prompted to select a previously-captured photograph to transfer, while in another the user is prompted to take a new photograph. The mobile device 103 may send the photograph file and/or the photograph file's metadata to the network application system 104. This may be accomplished in a number of ways, such as by email, by Multimedia Messaging Service ("MMS"), File Transfer Protocol ("FTP"), HTML, XHTML, XML, direct upload from the mobile application store client, any other transfer method or protocol suitable for transmitting such data, and/or any combination thereof. The network application system 104 may detect a mobile device's resources using the photo metadata service 132 before a mobile application store client 150 is installed on the mobile device 103 or afterwards.

In one embodiment, the mobile device 103 provides a photograph file to the photo metadata service 132 so that the network application system 104 can provide the correct version of the mobile application store client 150 to the mobile device 103. As explained above, this feature may be used in embodiments in which the network application system 104 offers multiple versions of the mobile application store client 150, suited for different mobile devices based on device resources 160 of a mobile device 103. For example, there may be an iOS version, an Android version, a Blackberry OS version, etc. Some users may be unaware of their mobile device's make and model, and allowing a user to take a photograph and transmit that photograph to the network application system 104 may reduce instances of users attempting to obtain incorrect versions of the mobile application store client 150. The photo metadata service 132 extracts information from the photograph file. Such information, which is commonly included in the photo files generated by many preexisting mobile devices, may allow the network application system to determine the operating system or other software on the mobile device 103, the mobile device camera's resolution, the mobile device's manufacturer and model number, and/or other information which may be represented in image metadata. For example, some mobile devices identify their operating system through the "Software" tag of Exif metadata. The photo metadata service may compare the model number obtained from the photograph metadata against device default data 123. The device default data may indicate what resources are commonly associated with a particular mobile device model, for example the resources which are provided on a mobile device by the manufacturer. This may be used to pre-populate user data 120, supplement information obtained by the interrogation service 153, and/or verify information obtained from the information service 153. In another embodiment, interrogation is not needed or performed, for example because sufficient information was obtained from photograph metadata.

In other embodiments, the network application system 104 determines which version of the mobile application store client 150 to provide a particular mobile device 103 based on data included in the mobile device's communications with the network application system 104, such as data stored in network resource access requests—an example being HTTP GET requests. Alternatively or additionally, the network application system 104 may provide a mobile device 103 with a device-neutral preliminary interrogation client which performs an initial interrogation to provide the network application system 104 information concerning the mobile device's resources. For example, a JAVA application, applet, or script may be run by the mobile device 103, to perform the initial interrogation, and the information from that initial interrogation may be used in determining which mobile application store client 150 to provide to the mobile device 103.

The embodiment illustrated by FIG. 2 includes functionality to improve application requirements data by detecting correlations between application crashes and device resources 160. Specifically, the system 104 includes a crash service 135 as part of its application store service components 130. The crash service 135 is in communication with a crash detect service 151 on a mobile device 103. The crash detect service 151 may be part of the mobile application store client 150, or may be implemented separately from it. In the present embodiment, the crash detect service 151 detects when an application 161 on the mobile device 103 crashes. This can be performed by checking for error reports, monitoring memory blocks, interacting with an application programming interface ("API") provided by the mobile device's operating system, and/or by some other method capable of detecting that an application crashed.

The mobile application store client 150 sends information concerning the detected crash to the crash service 135 within the network application system 104. The information may be contained within a crash report which identifies, for example, the application 161 that crashed and the device resources 160 associated with the mobile device 103 on which the application 161 crashed. The crash report may also include an identification of the mobile device and/or a user account associated with the mobile device or the mobile application store client on that device. The crash report may also contain information such as the identities of other applications running on the mobile device 103 at the time of the crash. In some embodiments, a crash report is obtained using an exception handler. It will be understood that the term "crash report" is not limiting, and includes data describing a variety of situations in which an application has failed to operate properly, including crashing, freezing, stalling, continuously looping, and any combination thereof.

The crash service 135 may store the crash report, or data derived from it, in data storage for crash data 122. The crash service 135 obtains crash reports from a number of mobile devices 103, and aggregates the collective crash data 122 in order to detect crash correlations. For example, a new version of a resource, such as the OpenGL 3D graphics library, may be released which causes applications which ran with generally low crash rates under prior versions to crash more frequently. Consequently, more crash reports would be generated by mobile devices' crash detect services 151, and the network application system's crash service 135 would store resulting data as crash data 122. The crash service 135 may run crash aggregation and analyses processes. During one such crash aggregation and analysis process, the crash service 135 may detect that there is a statistically consequential correlation between devices having a particular resource, such as the new graphics driver, and a particular application crashing on those mobile devices. Such detection could then trigger crash correlation actions.

Upon detecting a crash, the crash service 135 may undertake crash correlation actions which can include updating application requirements data in order to reflect the incompatibility believed to be responsible for the increase in crashes. For example, the resource requirements data for the application at issue could have its requirements automatically updated with a requirement that the particular resource, such as the new version of the graphics driver, is not present on a mobile device. This update of the application requirements data may be flagged so that it can be identified as having come from the crash service 135, rather than other sources such as developer-specified requirements, requirements based on quality assurance testing (which may be automated and/or manual), and/or some other source. Such an update may cause the app store pages to no longer show the application as being compatible with certain mobile devices, which may cause the application to no longer appear in the app store to some users.

In another embodiment, a crash correlation action includes sending a notification to an entity associated with the application for which a crash correlation was detected. For example, the network application system 104 may send a notification message to the application's developer and/or publisher, such as by email or a text message, informing them of the detected crash correlation. The notification may specify details of the correlation, such as the resource for which the incompatibility was detected, the number of crashes detected, the degree of correlation, such as the percentage of tracked mobile devices with the suspect resource which have experienced a crash, and/or the frequency of crashes on mobile devices with the suspect resource. Furthermore, the developer and/or publisher may be presented with crash correlation information at a later time, such as when the developer submits a new version of the application to the network application system 104. The developer may be asked to verify that the issue has been resolved and the new version corrects the incompatibility which caused the previously detected crashes. In another embodiment, a developer and/or publisher may be presented with the option to reverse the update to the resource requirements tree that was caused by the crash service's crash correlation action.

Although the embodiment disclosed in FIG. 2 shows network various components as residing within a single network application system, in other embodiments the components are further distributed and may be performed or provided by multiple systems in communication with each other. Furthermore, any individual component, such as a data component 111, 113, 120, 121, 122, 123, may be provided by a distributed storage system, a virtualized storage system, and/or a cloud-based storage system. In another embodiment, the network application system acts as an application portal which aggregates applications hosted on other systems and offers users a unified way of browsing, reviewing, downloading, and/or running the applications.

Figure 3:
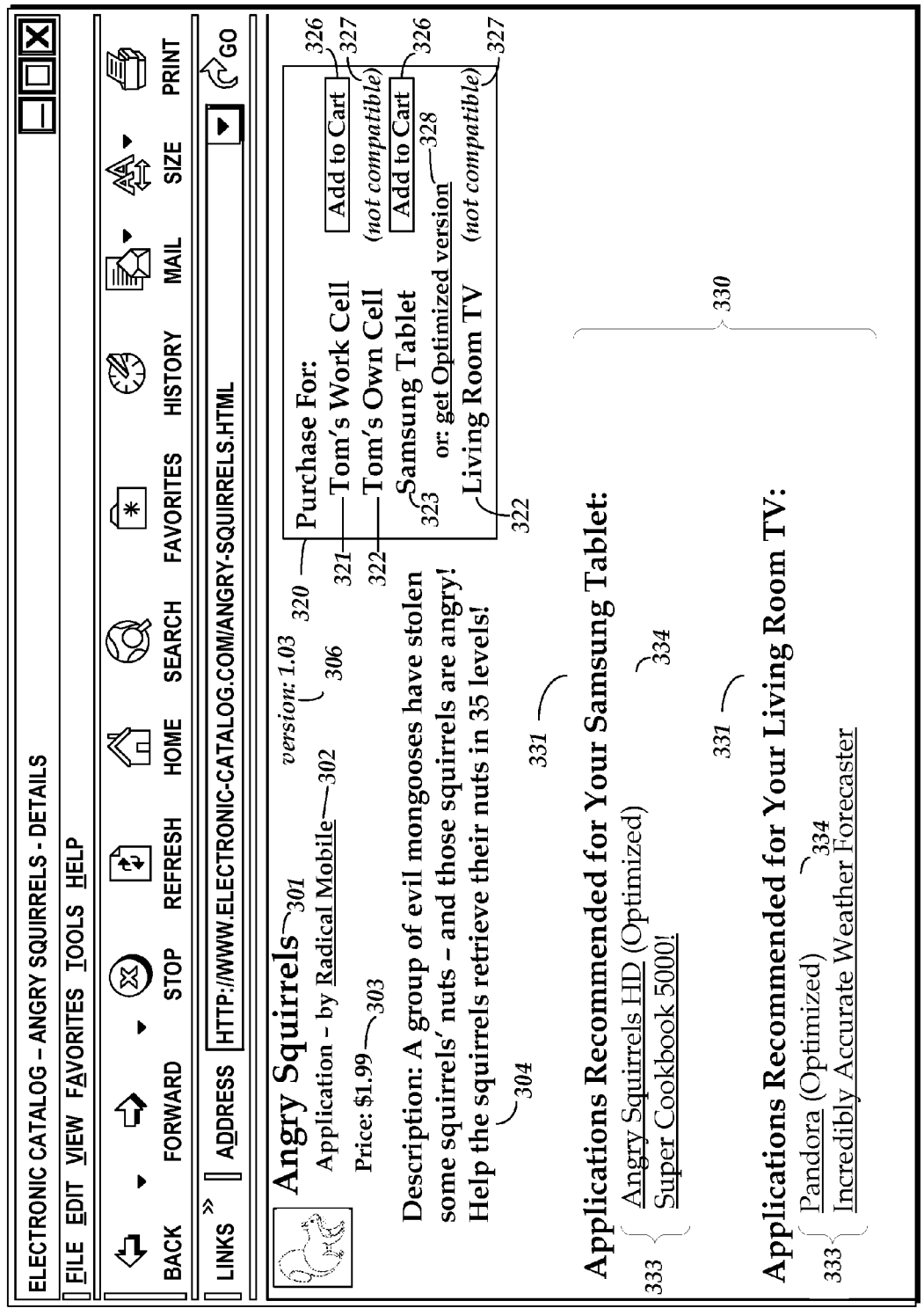
FIG. 3 illustrates one example of an interface through which a user may be presented with information indicating the compatibility of a particular application with one or more particular mobile devices associated with the user.

Referring to FIG. 3, an example of a user interface is shown in which the user receives personalized information based on compatibilities between the user's mobile devices and applications offered by the network application system 104. In this embodiment, the user may be viewing a network resource provided by the network application system's server 110, based on information provided by personalization services 114. FIG. 3 shows a detail page view for a particular (fictitious) mobile application, Angry Squirrels 301. The detail page may provide a variety of information about the application, including a detailed description 304, the application's current version number 305, its developer 302 and its price 303. The details page also includes personalized compatibility information 320. In one embodiment, the network application system 104 maintains user data 120 which associates users with mobile devices, and stores information concerning the device resources for at least some of those mobile devices. A user may access the network application system through a user system 102, for example by going to a network-accessible page and providing login information associated with the user's account. Alternately or additionally, the system may recognize the user's mobile device 103 by a browser cookie or key transmitted by the mobile device 103, such as by the mobile app store client 152. The system may provide users with the ability to create new accounts through network resources provided to user systems, and/or through the mobile application store client.

In the provided example of FIG. 3, the application 301 is shown to be compatible with two of the user's mobile devices 321, 323, and incompatible with two of the user's mobile devices 322. The system presents the user with the option to purchase the application for either of the user's compatible devices by adding the application to the user's cart 326. In one embodiment, the application may be purchased for a particular mobile device, reflected by the separate "Add to Cart" buttons 326 for the user's two compatible mobile devices 321, 323. In other embodiments, applications may be purchased and licensed such that a user may purchase an application once and use the application on all of the user's compatible applications. It will be understood that the term "purchase" is used to encompass scenarios in which a user pays to download and/or use an application but does not take any ownership interest in the application. In some embodiments, an application's developer and/or publisher may specify whether an application can be purchased on a per-account or per-device basis. In another embodiment, a user may be presented with the ability to obtain an updated version of an application previously obtained through the network application system. Alternately or additionally, updated versions may be obtained on the mobile device 103 directly, such as through an update service component of the mobile application store client 150.

The personalized compatibility information 320 in the illustrated embodiment presents information to the user informing the user that, for the user's Samsung Tablet, an optimized version of the current application is available. The system may detect the existence of an optimized version by comparing user data 120, such as device resources associated with one or more of the user's mobile devices, with application requirements data 121. In one embodiment, the system may store data reflecting relationships between applications offered by the application store. For example, the network application system 104 may offer the Angry Squirrels application as well as an Angry Squirrels HD application. These applications may have separate version numbering, and the system may store or detect a relationship between the applications such that when a user views a details page for one application, the system detects whether one or more of the user's mobile devices would be more compatible with another related application. In FIG. 3, the user's Samsung Tablet 323 has been detected as being more compatible with another version of Angry Squirrels, and the user is informed 328 of this. The user is provided with a link to obtain the Optimized version of the application 328. In other embodiments, additional information concerning the optimized version may be included in the network resource provided to the users, and/or the "Add to Cart" button may be replaced with an "Add optimized version to cart" for the Samsung Tablet.

In one embodiment, the system informs the user that some of the user's mobile devices are not compatible with the currently viewed application 327. In some embodiments, the system provides the user with additional information, such as why a particular mobile device is detected as being incompatible with the application. This may identify particular incompatibilities, such as resource deficiencies of the mobile device. The system may also provide the user with information or processes for improving a mobile device's compatibility. For example, if a new version of the mobile device's operating system is available and compatible with the mobile device, the system may suggest that the user upgrades the mobile device to this newer operating system version. The system may further provide information of how to perform the upgrade, or may play a role in providing the new operating system version to the user. In other embodiments, the system may allow users to download applications to a mobile device which the system detected as being incompatible with the mobile device. The system may warn the user of the expected incompatibility before allowing such a download. In some embodiments, the system may inform users when the viewed application is already installed on one of the user's mobile devices.

FIG. 3 shows an embodiment including personalized recommendations 330 based on compatibility information. In the illustrated embodiment, the system presents the user with recommendations 330 specific to mobile devices 331 associated with the user. Personalization services, such as personalized recommendations, may be based on a combination of factors, such as device compatibility, degree of compatibility, user browse history, user purchase history, currently viewed item, applications on the user's mobile devices, or any combination thereof. The personalized recommendations may also indicate the degree of compatibility, which may be used in determining the order of recommendations to the user. For example, Angry Squirrels I-ID is detected as being optimized for the user's Samsung Tablet 331 and Pandora is detected as being optimized for the user's Living Room TV. These optimized recommendations appear at the top 334 of each device's respective recommended application list 333. In another embodiment, other degrees of compatibility are shown to the user, such as a compatibility score.

Although FIG. 3 illustrates an embodiment in which compatibility information and personalized compatibility recommendations are presented to the user through a network resource browsing application, such as a web browser interface, some embodiments may also use other interfaces. For example, the mobile application store client 151 includes a store client service 152 through which a user may view application details and personalized recommendations based on compatibility information. In one embodiment, the store client service 152 only displays compatibility information relevant to the mobile device 103 on which that instance of the store client service 152 is running. For example, rather than displaying a personalized compatibility information section 320 containing compatibility information for all of the user's mobile devices, the store client service 152 may simply present the user with information indicating whether the current mobile device is compatible with a particular application. Applications which are incompatible with the current mobile device may be automatically filtered out to avoid being presented to the user on that mobile device. In another embodiment, the store client service does present personalized compatibility information for the user's mobile devices other than the mobile device on which that instance of the store client service 152 is running.

Figure 4:
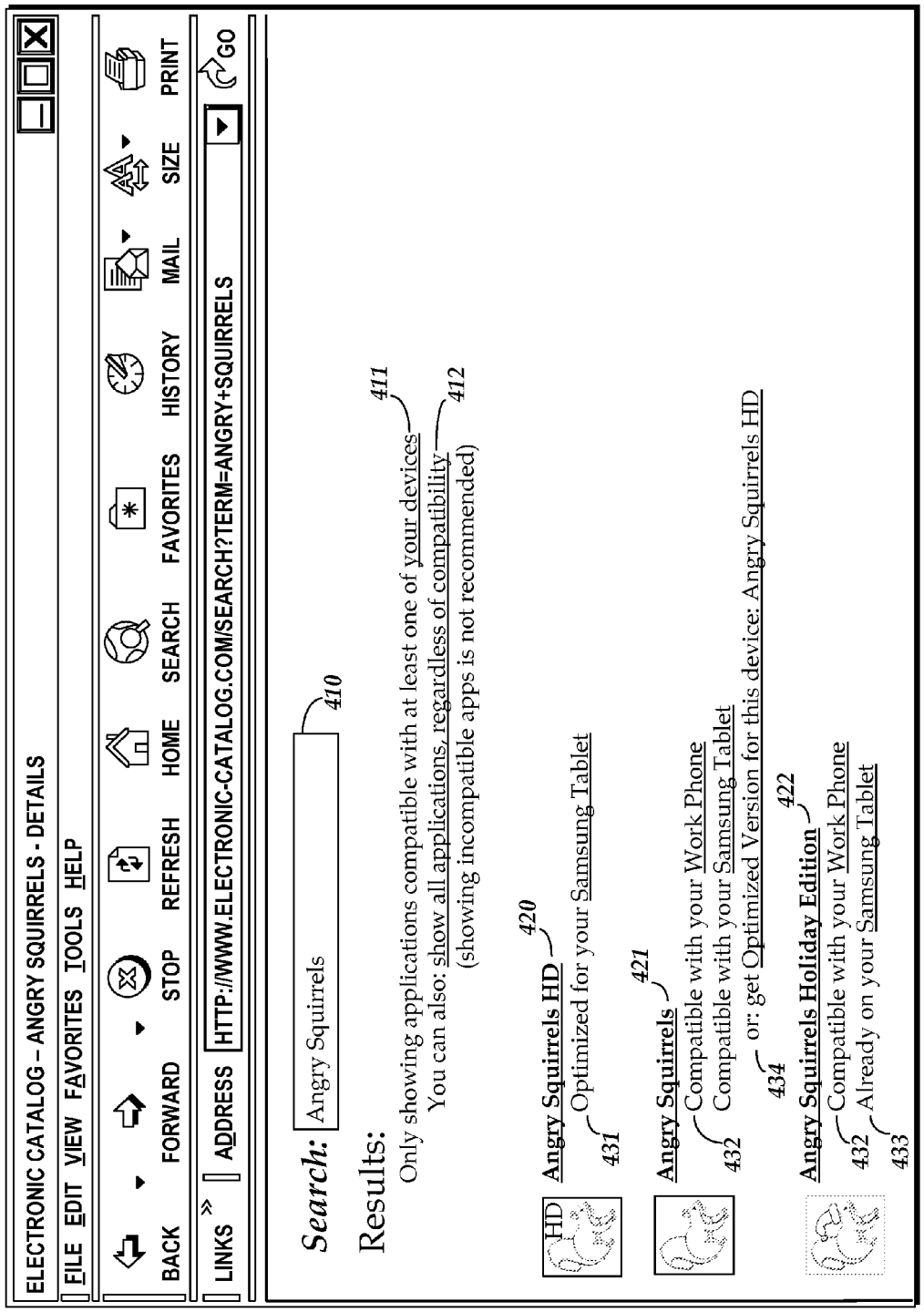
FIG. 4 shows one example of how a user may be presented with search results based at least in part on the compatibility of relevant applications with the user's mobile device(s).

Referring to FIG. 4, personalized search results are presented to a user in another embodiment. Search results may be presented to the user based on application compatibility, as determined by the application compatibility matching logic 134 of the application store service components 130. Factors, including those discussed in the context of personalized recommendations, may be considered in determining which applications are presented to the user, and in which order. In FIG. 4, the user has searched for "Angry Squirrels" 410. The user is informed that the system is only presenting application results which are compatible with at least one of the user's mobile devices 441. The user is presented with an option to remove this filter 412, and warned that doing so is not recommended. In other embodiments, the option to remove the filter may not be present, or the system may default to displaying all applications and optionally present the user with the ability to filter results so that only compatible results are displayed. Alternately or additionally, the system may present the user to filter or influence results of any personalization service, including search, recommendations, and browsing, based on filters for compatibility with specific mobile devices, or based on compatibility levels. For example, a user may filter search results to only those applications which are compatible with his Samsung Tablet, or only applications which have a compatibility score of at least 95.

In the example illustrated in FIG. 4, the user is presented with information concerning an application, Angry Squirrels HD, which matches the search term 410 and is optimized for one of the user's mobile devices 431. Other search results 421 422 include applications compatible with at least one of the user's mobile devices 432. For an application 421 where there is an optimized version available for one of the user's devices, the search results page suggests the optimized version to the user 434. The system also informs the user when an application is already installed on one of the user's mobile devices 433.

In another embodiment, application compatibility matching logic is performed by code run the mobile device 103, such as through the mobile application store client 151. For example, the mobile application store client 151 may send a user's search terms to the network application system 104, which may return a list of search results and application requirements data 121. The mobile application store client 150 may perform application compatibility matching logic based on the device's resources, which have been interrogated by the interrogation service 153, and the application requirements data 121 transmitted by the network application system. The mobile application store client may personalization methods, such as sorting and filtering search results, providing personalized recommendations, and providing personalized browse information, based on the results of the application compatibility matching logic.

Figure 5:
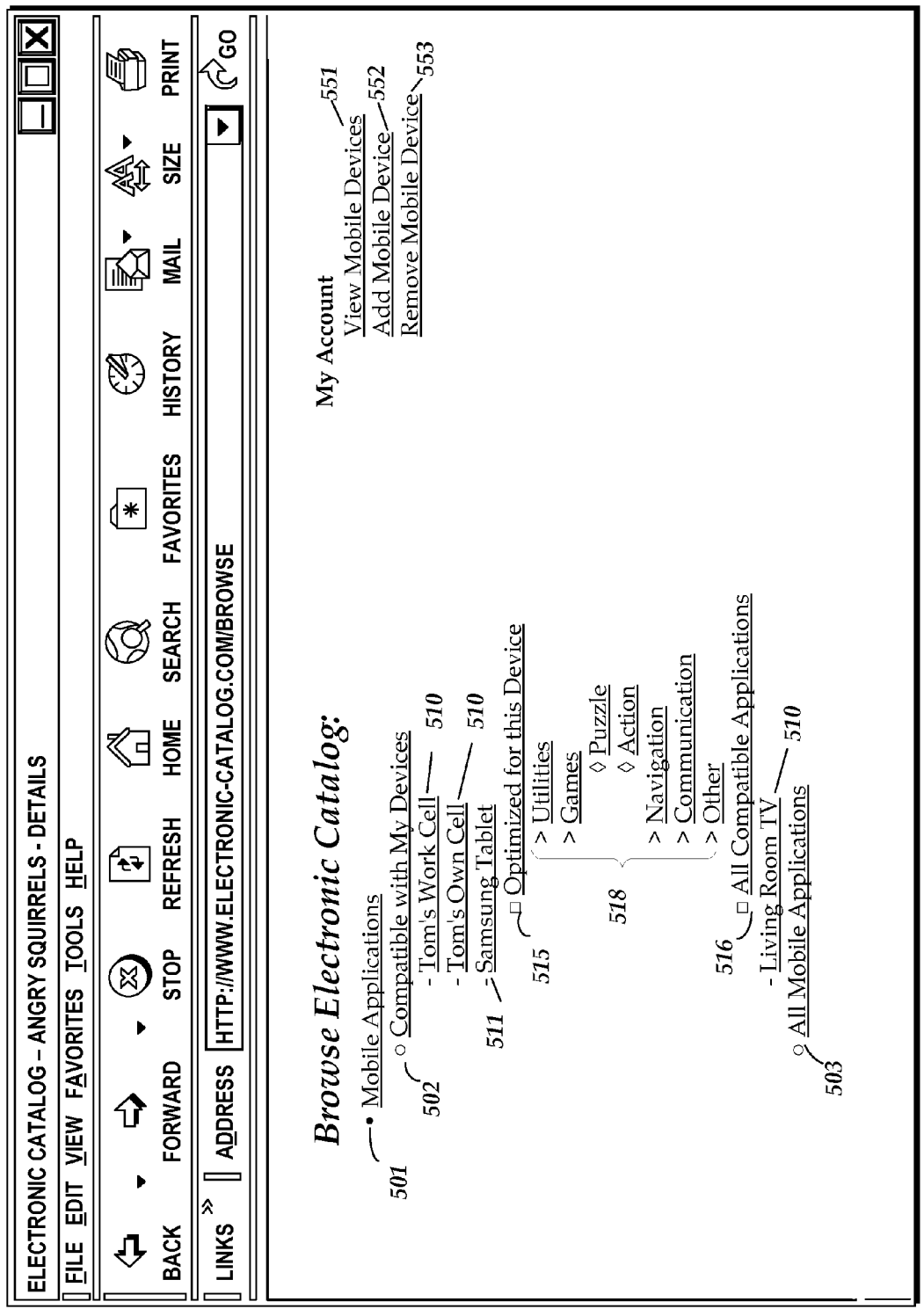
FIG. 5 illustrates one example of how a user may be presented with a browseable interface of mobile applications, personalized based on the compatibility of the applications with the user's mobile device(s).

Referring to FIG. 5, the system provides personalized browsing based at least in part on compatibility matching. The network application system 104 may provide users with a category-based means of browsing the applications offered in the network application system 104. In this example, applications are classified as "Mobile Applications" 501. Sub-categories to the "Mobile Applications" 501 category are based on personalization services—the first sub-category contains applications which are "Compatible with My Devices" 502 while the second sub-category contains "All Mobile Applications" 503. In one embodiment, the network application system 104 stores data reflective of application compatibility matching logic 134 in persistent data storage, which may increase the speed with which the system is able to present personalized compatibility-based information to a user, such as through a personalized browsing interface.

In the illustrated embodiment, personalized browsing is further organized so that the compatible devices category 502 is sub-categorized according to the mobile devices associated with the user's account 510, 511. The sub-category related to one of the user's devices 511 has bee expanded to show further sub-categorization. Within the browse node corresponding to the user's Samsung Tablet 511, the system presents sub-categories for applications optimized for the device 515, and all applications compatible with the device 516. In another embodiment, applications may be designated simply as being compatible or incompatible, while in yet other embodiments, a plurality of compatibility indicators, scores, and/or grades may be used. In such embodiments, personalized interfaces such as a personalized browsing interface may be adapted to present users with sorting and information suited to the compatibility indicators, scores and/or grades used.

In the embodiment show in FIG. 5, the browse node corresponding to applications optimized for the Samsung Tablet 515 is further expanded to show categories of application genres 518. Applications may be classified, for example according to genres, by their developer, publisher, users, or some other entity. In the illustrated embodiment, the entries, such as browse nodes, within the personalized browse interface are hyperlinks to network resources which may provide additional information. For example, the hyperlink associated with "Mobile Applications" may take the user to a page providing a high-level summary of the variety of mobile applications available through the network application system, while the hyperlink associated with "Puzzle" may be associated with a network resource that provides a more specific set of information—in this case information related to mobile applications which are puzzle games and are optimized for the user's Samsung Tablet.

FIG. 5 also presents the user with a variety of control options relating to the user's account. The system presents the user with the ability to view further information related to the mobile devices associated with the user's account 551, to add a mobile device to the user's account 552, and to remove a mobile device from the user's account 553. If the user chooses to view the mobile devices associated with his account 551, the system may present a network resource which provides information related to all such devices, including, for example, the device resources associated with a mobile device, the applications installed on or accessible through the mobile device, the version of the mobile application store client 150 which the mobile device uses, and/or other relevant information.

A user may request that the system adds a mobile device to the user's account in a variety of ways. The user may obtain a mobile application store client 150 on their mobile device and provide some identifying information through the mobile application store client so that the system can associate that mobile device with the user's account. In another embodiment, a user accesses the network application system 104 through a user system 102 and requests that a copy of, or link to, a mobile application store client be sent to the user's mobile device 103. For example, the user may specify a phone number at which the mobile device 103 may receive SMS messages, or may specify an email address at which the mobile device 103 may receive email. The system may send a message to the mobile device which contains information related to the mobile application store client 150. Such information may include a user identifier so that once the mobile application store client 150 is on the mobile device 103, the mobile device 103 may be associated with the user's account without requiring further disclosure of identifying information by the user. In one embodiment, the user may remove or disassociate a mobile device from the user's account through a network resource provided by the network application system, and/or through the mobile application store client.

Figure 6:
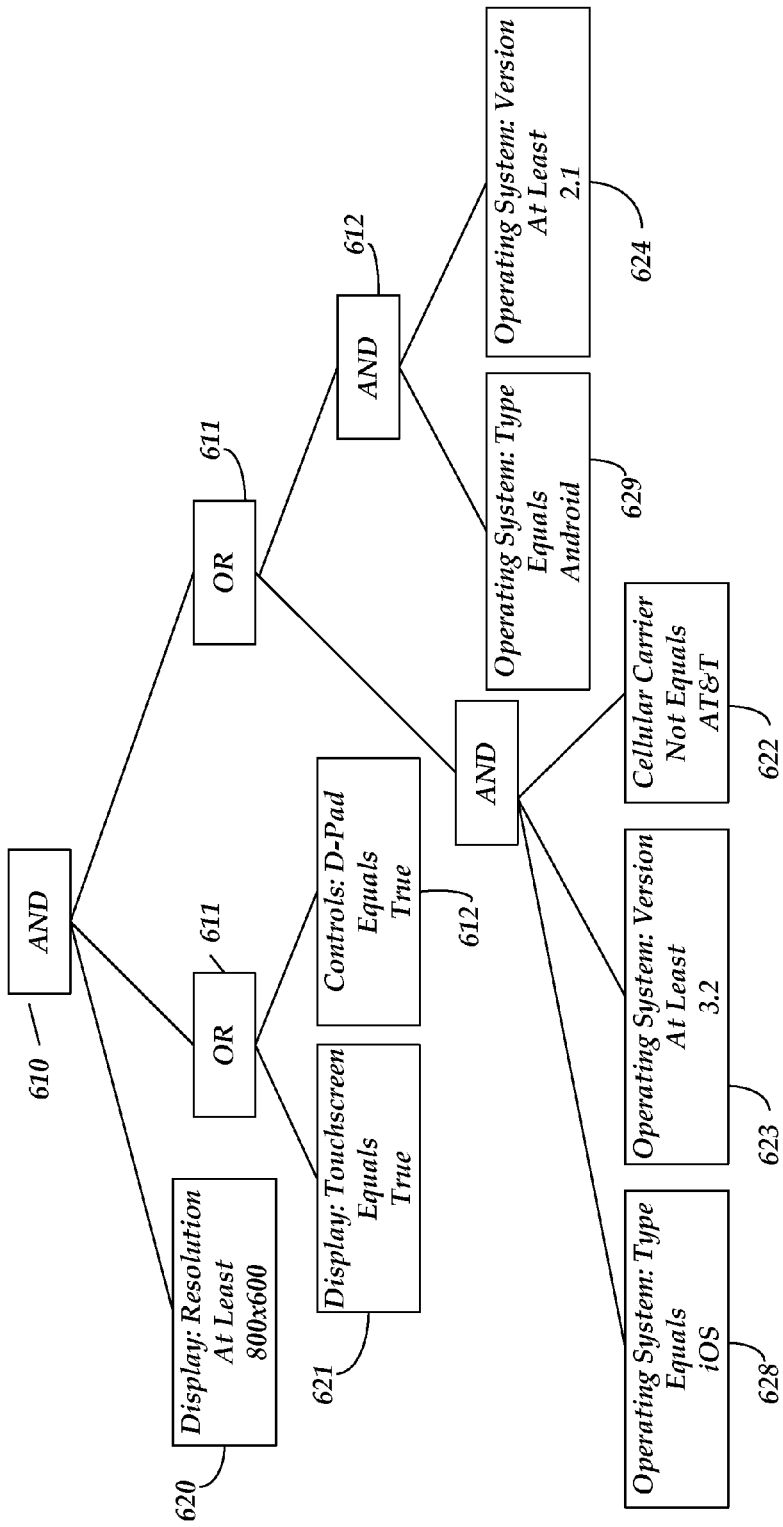
FIGS. 6 and 7 depicts examples of requirements trees that may be used to match application with mobile devices in some embodiments.

FIG. 6 show a representation of one embodiment of a requirements tree for one version of an application. The tree represents the logical structure of device resource requirements which a mobile device must meet in order to be considered compatible with version 1.03 of Angry Squirrels HD. In the disclosed embodiment, the requirements tree consists of requirements nodes which are either logical operation nodes or specific requirement nodes. Logical operation nodes may provide logical operations, such as AND, OR, XOR, NOR which define how many of the logical operation node's sub-nodes must be resolved to "True" in order for the logical operation node itself to resolve to "True". Specific requirements nodes may specify a requirement related to a specific device resource. For example, a specific requirements node may include three values: an identification of the device resource which it relates to, a description of the requirement type which it relates to, and a requirements value. As an example, specific requirements node 620 includes an identification of the "Display: Resolution" device resource, a requirement type of "At Least" and a requirements value of "800×600." The system would interpret node 620 as resolving to "True" if the particular mobile device which was being evaluated for compatibility had a display resolution with a value of 800×600 or greater. Otherwise, the system would interpret node 620 as resolving to "False."

The requirements tree has a root requirements node 610 which is a logical "AND" operation node. A system evaluating data represented by FIG. 6's requirements tree may attempt to resolve all three sub-nodes 620, 611 of the root node 610 in order to evaluate the root node 610 as "True". Because some sub-nodes are themselves logical operation nodes 611, the sub-nodes of those logical operations may also need to be evaluated. For example, the requirement tree requires that a mobile device either have a touchscreen display 621, or have a D-Pad controller 612. The requirement tree has two options for satisfying an operating system requirement: a mobile device must have either version 2.1 or greater 624 of the Android operating system 629, or must have version 3.2 or greater 623 of the iOS operating system 628 in addition to not having AT&T as their cellular carrier 622. A carrier-based requirement may be specified by an application's developer or publisher, or may be specified by a mobile carrier. For example, a mobile carrier may specify that it does not allow the user of video teleconferencing applications which require high-resolution cameras. The system may store data representative of such a restriction through a requirements tree.

The embodiment of FIG. 6 is intended as an example and a number of other formats and schemes may be used to store and represent application requirements data. For example, the system may use a point-based compatibility analysis approach where possible device resource values are associated with compatibility score points which may be added or subtracted from a cumulative compatibility score. In another embodiment, a compatibility score is determined at least in part as the product of a series of compatibility multipliers, which are applied based on the device resources of the mobile device. A compatibility score may be converted into a compatibility grade, such as "Excellent," "Good," "Poor," "A+," "B," "C−," etc. Compatibility grades may also be determined independently of compatibility scores through other compatibility evaluation embodiments.

Figure 7:
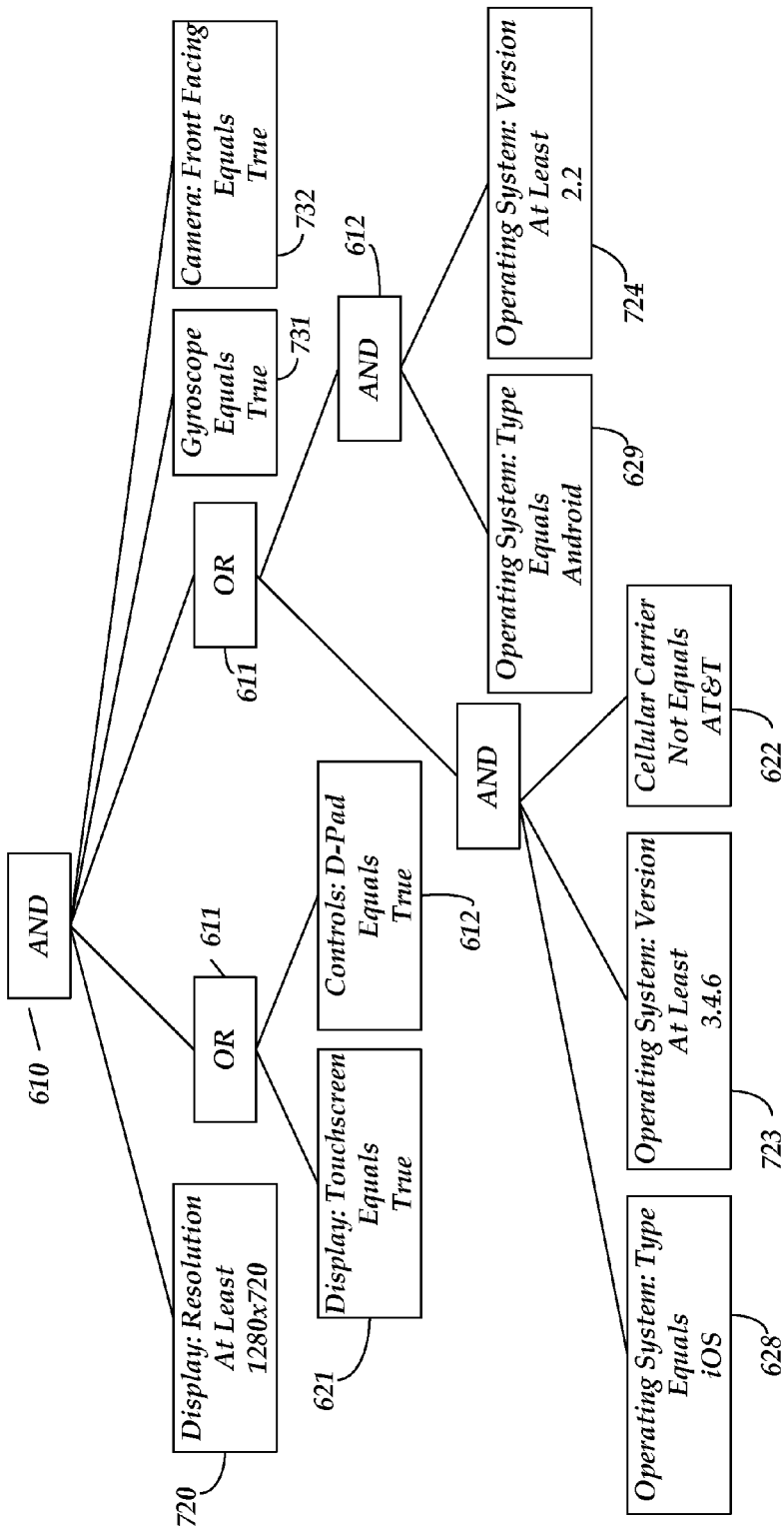

FIG. 7 presents a requirements tree which is related to the tree of FIG. 6. FIG. 7's tree represents requirements for the same application and version, but specifies requirements for a mobile device to be considered optimized for the mobile application, rather than merely compatible with the application. Comparing the nodes of the FIG. 7 tree with the nodes of the FIG. 6 tree reveals that a device must have a higher display resolution in order to be considered optimized 720 rather than simply being compatible 620. A mobile device must also have a gyroscope 731 and front facing camera 732 to be optimized for this version of the application. Another altered requirement relates to the mobile device's operating system version. An iOS mobile device must have at least version 3.4.6 to be considered optimized 723, and an Android mobile device must have at least version 2.2 to be considered optimized 724. Because of this example's stricter requirements for the optimized compatibility classification than the compatible classification, some devices may resolve "True" with the compatible requirements tree (and may therefore be considered compatible), but may resolve "False" with the optimized requirements tree (and may therefore not be considered optimized).

Figure 8:
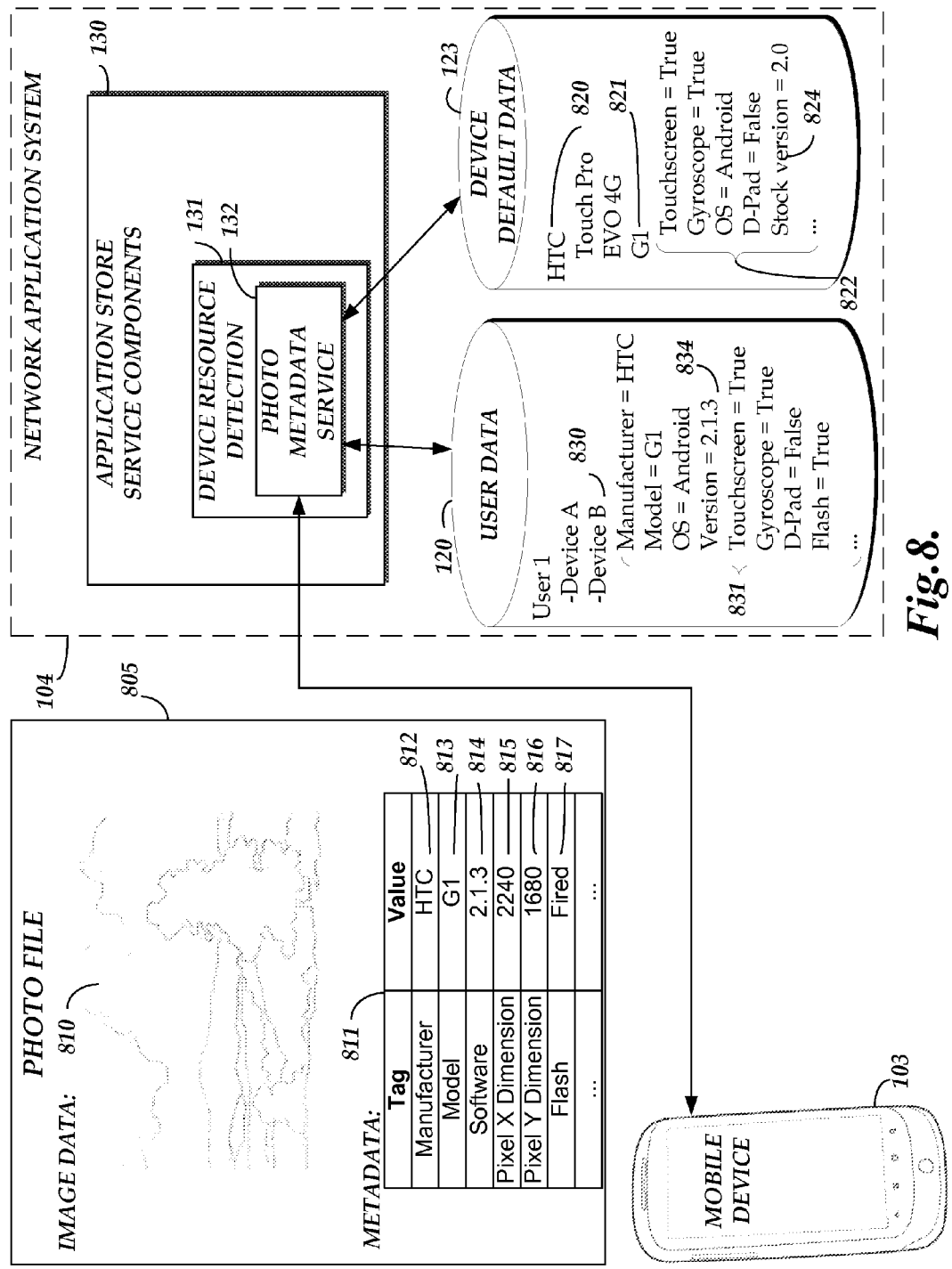
FIG. 8 depicts one embodiment of a system capable of detecting a mobile device's resources based at least in part on metadata from a photo taken by the mobile device.

Referring to FIG. 8, details are provided for an embodiment in which a photograph file 805 is used to determine the device resources of a mobile device 103. A photograph file may contain both image data 810 and metadata 811. An example of a type of photograph file metadata is the Exchangeable image file format ("Exif") which includes metadata tags and values in photograph files in order to specify information related to the photograph, such as when it was taken, the device which took it, the software of that device, the photograph's original resolution, whether a flash was used, the photograph's exposure time and FNumber, and/or other information. Many mobile devices automatically include photograph metadata 811, such as Exif format metadata, in photograph files 805 created using the mobile device's camera. The network application system 104 may be configured to analyze such metadata 811 in order to determine information about the mobile device 103 which took the image. In one embodiment, the system allows a user to email any photograph file 805 taken by their the user's mobile device 103, for example by sending the photograph by email, MMS, FTP, or other method, to the network application system's photo metadata service 132. The photo metadata service 132 then seeks to detect the device resources of the mobile device based at least in part on the metadata 811 contained in the photograph file 805.

If the metadata 811 includes an identification of the mobile device's manufacturer 812 and model number 813, the photo metadata service may perform a device default data lookup. In the example illustrated by FIG. 8, the network application system 104 includes device default data 123 which is organized according to manufacturer 820 and model number 821. The photo metadata service 132 extracts the metadata manufacturer information as "HTC" and model number as "G1" and checks whether there is a corresponding entry in the device default data 123. The system finds the HTC manufacturer entry 820, which contains a number of sub-categories for specific model numbers, including the G1 821. The photo metadata service may then read the device resource values which are associated with that model number. In this example, the device default data 123 represents that the G1 typically has a touchscreen, a gyroscope, and the Android operating system. The device default data 123 further represents that a G1's stock version of the operating system is 2.0 824. It may be the case that a manufacturer releases a mobile device with a particular version of an operating system, but users may later upgrade the operating system installed on their mobile devices, for example when a new version of the operating system is released.

In the absence of further information concerning the version of the operating system functional on the user's mobile device 103, the system may assume that the stock version 2.0 824 is functional on the mobile device 103. However, the system may also review the photograph file's metadata 811 to check whether more specific information for this particular mobile device 103 is available. In the provided example, the metadata 811 indicates that the mobile device was running operating software version 2.1.3 814 at the time that the photograph was taken. In this embodiment, the system considers such device-specific information to be more accurate than device default data 123, so it updates the user data 120 for this mobile device 830 to indicate that the operating system version is 2.1.3 834. Other information obtained from the device default data, such as the presence of a Gyroscope and the absence of a D-Pad controller, are also stored in the corresponding user data for the mobile device 830.

In the illustrated embodiment, the system obtains some user data concerning the mobile device's resources 831 based on the photograph file's metadata 811 without the use of device default data 123. For example, the metadata indicates that a flash was fired when the photograph was taken 817. The system infers that the mobile device 103 likely includes a flash as a device resource, and records that fact in the user data 120. Similarly, metadata 811 may indicate the native resolution of the photograph, for example by listing its X dimension pixel resolution 815 and its Y dimension pixel resolution 816. The system may store information concerning the mobile device's camera resolution based on such metadata. Other user data information may also be determined at least in part on metadata 811 information. In another embodiment, metadata information may include the location of the user device at the time the photograph was taken, for example by recording information obtained from the mobile device's Global Positioning System ("GPS") resource. The system may store such location based information, which may be used, for example, to further improve personalization services.

In various embodiments, the system uses photograph file based resource detection in addition to, in place of, and/or as a precursor to interrogation-based resource detection. For example, photograph file based resource detection may be used as a preliminary resource detection to assist with the determination of which version of the mobile application store client is best suited for a particular mobile device. Once the mobile application store client is on the mobile device, it may be capable of more efficiently and/or more accurately determining certain device resource information, however photograph file based resource detection may still be useful in supplementing other types of device resource information. In one embodiment where the mobile application store client is located on the mobile device 103, the mobile application store client includes an integrated photograph capture and upload functionality which allows the user to take a photograph but does not require the user to specify the means of transmission (such as email or TAMS) which is used to transmit the photograph file 805 to the network application system 104. Instead, the mobile application store client performs the transmission, possibly without needing further interaction from the user.

In other embodiments, device default data 123 may be provided by a person, such as a system administrator, or may be generated at least in part by the system based on observed user data. For example, the system may aggregate user data obtained through interrogation in order to determine common device resources associated with a particular mobile device model number. The system may record these common device resources so that the photo metadata service 132 can obtain information concerning the device resources likely installed on the mobile device 103 which took the photograph file 805, based at least in part on statistical observations.

Figure 9:
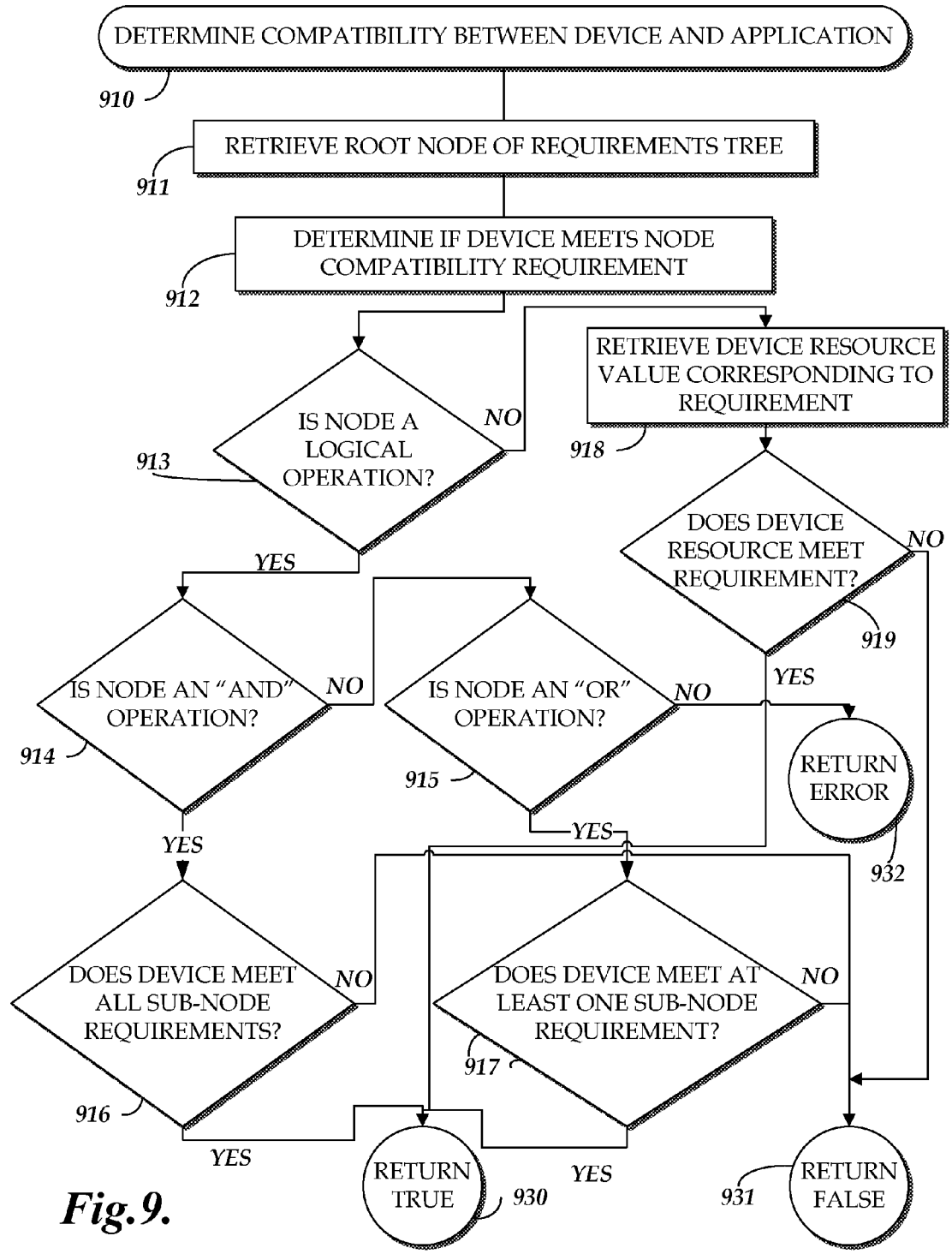
FIG. 9 depicts an illustrative compatibility matching method for comparing a mobile device's resources to the resources required by an application.

Referring to FIG. 9, one embodiment of a method for determining compatibility between a device and an application 910 is disclosed. The method begins by retrieving the root node of a requirements tree associated with the application 911. The method should also have access to device resource information in order to evaluate that resource information against the elements of the requirements tree. For each evaluated node, the method seeks to determine whether the mobile device meets the node's compatibility requirements 912. If the node is a logical operation 913, then this is evaluated based on the type of logical operation and the value of logical operation node's sub-nodes. In some embodiments, the method is performed recursively. If a logical operation node is an "AND" operation 914, then the method checks whether the mobile device meets all of the logical operation node's sub-node requirements 916. If so, the AND node resolves to true 930, otherwise it resolves to false 931. If a logical operation node is an "OR" operation 915, the method checks whether the mobile device meets at least one of the logical operation node's sub-node requirements 917. If so, the OR node resolves to true 930, otherwise it resolves to false. The illustrated embodiment configured to handle only AND and OR logical operation nodes, so an error is returned if some other type of operation is encountered 932. In other embodiments, the system is capable of handling other logical operation nodes without returning an error. If a node is not a logical operation node, the present embodiment assumes that it is a specific requirement node and retrieves the mobile device's device resource value corresponding to the requirement of the specific requirement node 918. The method then determines whether the corresponding device resource meets the requirement of the specific requirement node 919. If so, the specific requirement node resolves to true 930, otherwise it resolves to false 931. In other embodiments, requirements trees may support node types other than, and/or in addition to, logical nodes and specific requirements nodes.

Although embodiments have been described in which different compatibility indicators, such as "compatible" and "optimized", are determined by distinct requirements trees, in other embodiments one requirements tree may contain information related to a plurality of compatibility indicators. For example, a specific requirement node may contain information concerning the minimum CPU speed required for a mobile device to be considered optimized, as well as the minimum CPU speed required for a mobile device to be considered compatible. The node may be compared against a particular mobile device and the system will resolve the node to the highest level of compatibility supported by the mobile device's resources—for example, resolving the node to "optimized" if the mobile device's CPU meets the required speed. Logical operation nodes may similarly resolve to the highest degree of compatibility supported by their sub-nodes, based on the logical operation of that logical operation node—for example, an AND node may resolve to the highest degree of compatibility supported by all of its sub-nodes, while an OR node may resolve to the highest degree of compatibility supported by at least one of its sub-nodes. In other embodiments, application requirements are represented by data structures other than trees, such as lists or matrices.

In one embodiment, application requirements data 121 may be obtained from a variety of sources. The system may require an application's developer to submit sufficient information related to the application's resource requirements in order for the application to be included in the network application system. Alternately or additionally, the system may itself perform tests of applications, such as in virtualized mobile device environments, in order to determine the applications' resource requirements. Individuals associated with the network application system, such a quality control personnel, may perform manual verification of requirements data. In another embodiment, users are able to provide input concerning resource requirements data. In an embodiment which will be described further with reference to FIG. 10, requirements data is updated by a crash service 135 of the network application system 104.

Figure 10:
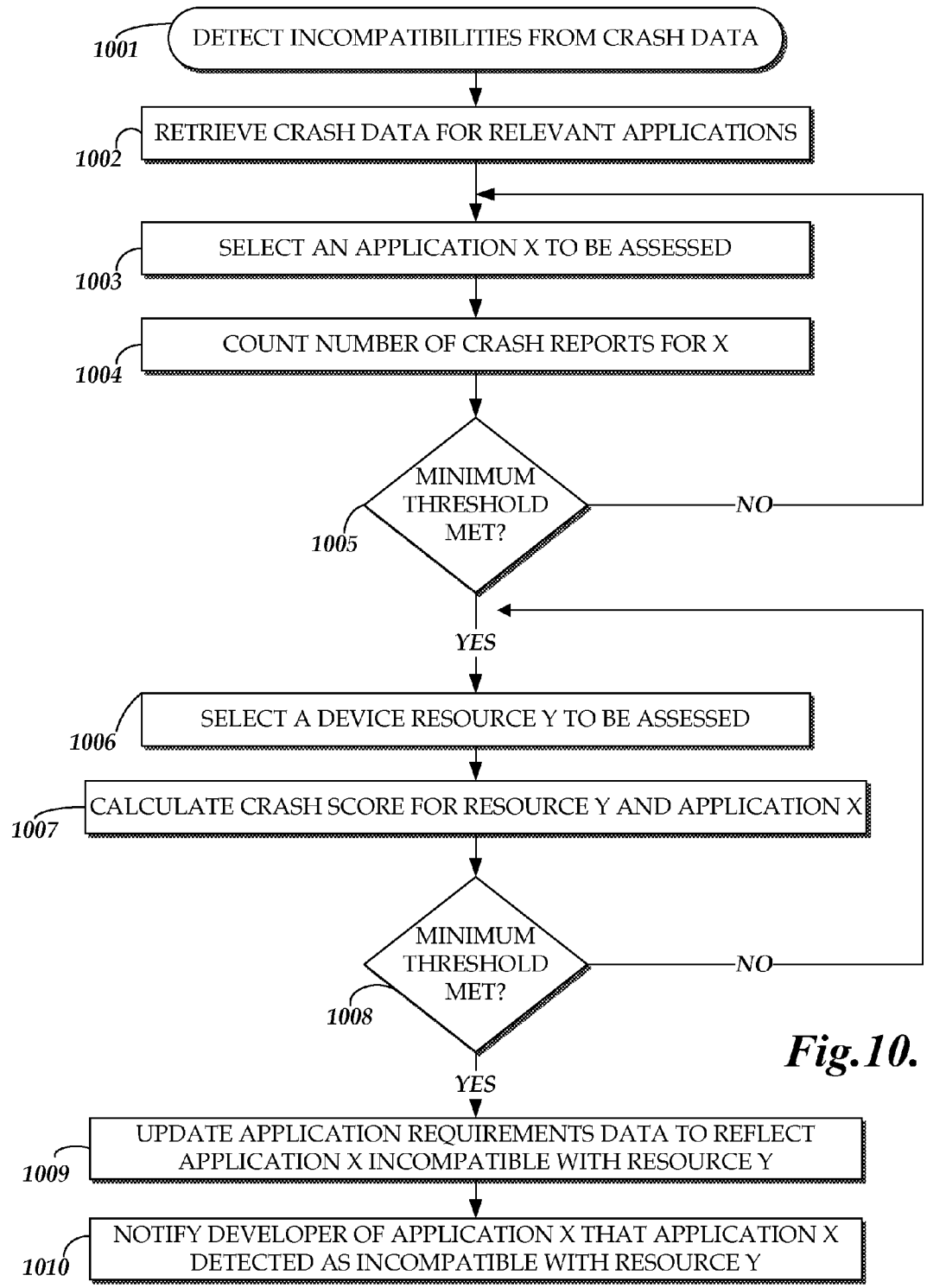
FIG. 10 depicts an illustrative crash correlation detection method for detecting a correlation between an particular application running on mobile devices all having a particular resource, and an increased rate of the application crashing on those devices.

Referring to FIG. 10, an exemplary method is illustrated for detecting incompatibilities based on crash data 1001. Such incompatibilities may indicate that a resource tree stored within the system's application requirements data 121 contains inaccurate information which is permitting mobile devices to obtain applications which are not actually compatible with those mobile devices. The system retrieves crash data for relevant applications which it is evaluating for incompatibilities 1002. The system may occasionally perform evaluations for all applications which it offers, may evaluate some applications at random, and/or may evaluate applications based on triggering events, such as an administrator's request. In another embodiment, an application is automatically evaluated for incompatibilities if a certain number of crash reports are received, a certain number of crash reports are received within a certain timeframe, and/or a certain number of crash reports are received relative to the number of copies of the application which have been provided to mobile devices.

The system then selects an application, designated in this example as application "X" to be assessed 1003. The system counts the number of crash reports which have been received for X 1004, and checks whether a minimum threshold of crash reports has been met 1005. In other embodiments, the system only considers crash reports received within a certain time period, or by a certain segment of users. Alternately or additionally, the system may weigh certain crash reports more heavily than others in determining whether a threshold has been met and/or whether an incompatibility exists. For example, more recent crash reports may be weighted more heavily than older crash reports. Crash reports may also be weighted based on severity of their crash, so that a crash which cause a more serious mobile device malfunction has its crash report weighted more heavily than a crash report corresponding to a less significant crash. The system then selects a device resource, Y, to be assessed for incompatibility with application X 1006. Device resource Y may be a particular value for a device resource, such as a specific version of an operating system. Device resource Y may also reflect a range of possible values for a device resource, such as a range of versions of a particular software driver, or the absence of a particular device resource.

The system calculates a crash score for resource Y and application X, such that the crash score reflects the degree of detected incompatibility when a mobile device with resource Y runs application X 1007. In some embodiments, the crash score is calculated at least in part based on weights associated with various crash reports. Other embodiments may not rely on a crash score, and may have some other way of detecting and/or representing an incompatibility correlation. If the crash score meets a minimum threshold for incompatibility 1008, the system may update the application requirements data to reflect that application X is incompatible with resource Y. For example, the application requirements data may be updated to indicate that a crash detection based incompatibility has been observed and that the application should not be offered to mobile devices with resource Y. If a minimum threshold crash score has not been met, the method may continue by evaluating another resource for incompatibility with application X. That next evaluated resource could be a different value associated with a particular device resource, such as evaluating whether the presence of a different model of graphics processing unit ("GPU"), other than the GPU model just evaluated as Y, is incompatible with application X. The system may also begin an evaluation process for another application.

The illustrated embodiment also notifies application X's developer that the application has been detected as being incompatible with resource Y. Such a notification may be sent using email, using a Really Simple Syndication ("RSS") feed, using a message which may appear on a network resource presented by the network application system to the developer, such as on a developer-specific account webpage, and/or some other notification method.

In another embodiment, the minimum thresholds for evaluating a set of crash reports 1005, and the minimum thresholds for determining whether an incompatibility has been detected 1008, varies based on factors such as application type, application cost, application popularity, developer/publisher input, and/or any combination thereof. For example, the system may allow a higher frequency of crashing for game applications than for system utility applications, before such an application is treated as incompatible with a certain device resource.

As has been discussed, a device resource evaluated for incompatibility with an application may be of a number of different categories, such as a particular hardware component model number, a particular operating system or version of that operating system, a mobile carrier, the presence of absence of some thing such as a subscriber identity module ("SIM") card, the presence of another piece of software on the mobile device, and/or the fact that a particular other piece of software on the mobile device was running at the same time as the evaluated application X. Some embodiments of the system may respond to a detected incompatibility based on the cause or type of cause of that incompatibility. For example, a detection of an incompatibility with a device resource Y which is a hardware component may result in updating application requirements data so that mobile devices with Y are not presented with application X. On the other hand, if device resource Y represents another application running concurrently with application X, the system may present users with a warning suggesting against running both applications concurrently, or the mobile application store client may prevent one application from being launched while the other application is still running.

Although the illustrated embodiment describes detecting incompatibilities based on individual device resources, in other embodiments the system analyzes crash reports for statistical correlations indicating an application's incompatibility with sets of device resources. For example, there may be no statistically significant correlation of incompatibility when application X is used on a device with device resource Y, or with device resource Z, but when application X is used on a device with both device resources Y and Z, there is a higher incidence of crashes. An embodiment of the system considers such device resource sets in order to detect related incompatibilities and may take appropriate action based on incompatibility sets.

In another embodiment, a user or set of users may be associated with a crash sensitivity level and the system may evaluate whether an application is compatible with such a user's mobile device based at least in part on that crash sensitivity level. For example, a group of users associated with a corporate entity may be particularly sensitive to applications crashing due to the critical nature of their enterprise work. The system may associate those users' accounts with a high crash sensitivity and the system may then determine that applications which, for other users may be considered compatible based on crash likelihood, are considered incompatible for the more crash-sensitive users.

The network application system 104 may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 2, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

What is claimed is:

1. A method of assessing incompatibility between a mobile device application and mobile devices, the method comprising:
providing users access to an electronic catalog, said electronic catalog providing functionality for identifying and downloading mobile device applications;
transmitting, to a mobile device, a crash detection component configured to detect when a mobile device application on the mobile device fails to operate properly;
receiving, from the mobile device, crash report data, said crash report data reflective of the identity of a mobile device application which failed to operate properly on the mobile device, and data reflective of device resources of the mobile device;
analyzing the crash report data, in conjunction with crash report data obtained from other mobile devices, to assess, for a class of mobile devices, whether the mobile application is compatible with said class;
incorporating information reflective of a result of said assessment into at least one page of the electronic catalog;
said method performed by a computing system that comprises one or more physical servers.

2. The method of claim 1, wherein said class of mobile devices comprises at least one of (1) mobile devices having a particular resource (2) mobile devices lacking a particular resource or (3) mobile devices having a particular setting or configuration of a particular resource.

3. The method of claim 1, wherein said class of mobile devices comprises mobile devices of a particular model.

4. The method of claim 1, further comprising automatically updating compatibility data to reflect that the mobile device application has been detected as being incompatible with the mobile device resource.

5. The method of claim 1, further comprising personalizing a page of the electronic catalog for a user based on the updated compatibility data.

6. The method of claim 1, further comprising, by said computing system, notifying a developer of the mobile device application of the detected incompatibility.

7. The method of claim 1, further comprising notifying users with mobile devices which include the mobile device application and the device resource of the detected incompatibility.

8. The method of claim 1, wherein said crash detection component is configured to detect that the mobile device application failed to operate properly by use of an exception handler.

9. The method of claim 2, wherein said resource comprises one or more of the resources selected from a group consisting of display resolution, display size, display pixel density, display color range, presence of a physical keyboard, presence of a virtual keyboard, presence of a touch-sensitive display screen, presence of a multi-touch compatible display, presence of a three-dimensional display, presence of a projector, presence of an external video output port, presence of a trackball, presence of a D-pad, presence of a microphone, presence of speakers, presence of a cellular voice radio, presence of a cellular data radio, type of cellular voice radio, type of cellular data radio, presence of a Bluetooth radio, version of Bluetooth radio, presence of a Wi-Fi radio, type of Wi-Fi radio, presence of an accelerometer, presence of a gyroscope, presence of a Global Positioning System, presence of a front-facing camera, megapixel value of a camera, presence of a particular installed operating system, version of installed operating system, presence of a particular device driver, presence of a particular software library, and use of a particular mobile carrier.

10. The method of claim 1, wherein said mobile device resource comprises a plurality of mobile device resources such that it is determined whether that that plurality of mobile device resources, in combination, are correlated with an increased likelihood of the mobile device application failing to operate properly.

11. The method of claim 1, wherein automatically analyzing the crash report occurs at least in part as a result of at least one of (1) a time interval, (2) the number of crash reports received, (3) the number of crash reports received within a certain timeframe, (4) the number of crash reports received for an mobile device application, and (5) the number of crash reports received for a mobile device application relative to the number of copies of the mobile device application which have been transferred to users.

12. The method of claim 1, wherein automatically analyzing the crash data comprises assigning weight values to crash data, said weight values affecting the likelihood of detecting a correlation between said device resource and said mobile device application failing to operate properly.

13. The method of claim 12, wherein said weight values relate to at least one of (1) the severity of the failure to operate properly, (2) the type of user device application which failed to operate properly, (3) when the failure to operate properly occurred, and (4) the mobile device on which the mobile device application failed to operate properly.

14. A system for assessing incompatibility between a mobile device application and mobile devices, the system comprising:
   a system configured to assess incompatibility between a mobile device application and mobile devices, the system comprising:
   a server system comprising one or more physical servers, said server system configured to provide users access to an electronic catalog, said electronic catalog providing functionality for identifying and downloading mobile device applications, said server system additional configured to transmit, to mobile devices, a crash detection component configured to detect when a mobile device application on a mobile device fails to operate properly;
   a data repository that stores crash report data received from mobile devices, said crash report data reflective of the identity of a mobile device application which failed to operate properly on the mobile device, and data reflective of device resources of the mobile device; and
   an analysis system configured to automatically analyze the crash report data, in conjunction with crash report data obtained from other mobile devices, to assess, for a class of mobile devices, whether the mobile application is compatible with said class.

15. The system of claim 14, wherein said class of mobile devices comprises at least one of (1) mobile devices having a particular resource (2) mobile devices lacking a particular resource or (3) mobile devices having a particular setting or configuration of a particular resource.

16. The system of claim 14, wherein said class of mobile devices comprises mobile devices of a particular model.

17. The system of claim 14, further comprising an update system configured to automatically update compatibility data to reflect that the mobile device application has been detected as being incompatible with the mobile device resource.

18. The system of claim 14, further comprising a personalization system configured to personalize a page of the electronic catalog for a user based on the updated compatibility data.

19. The system of claim 14, further comprising a notification system configured to notify the developer of the mobile device application of the detected incompatibility.

20. The system of claim 14, further comprising a notification system configured to notify users with mobile devices which include the mobile device application and the device resource of the detected incompatibility.

21. The system of claim 14, wherein said crash detection component is configured to detect that the mobile device application failed to operate properly by use of an exception handler.

22. The system of claim 14, wherein said mobile device's resource comprises one or more of the resources selected from a group consisting of display resolution, display size, display pixel density, display color range, presence of a physical keyboard, presence of a virtual keyboard, presence of a touch-sensitive display screen, presence of a multi-touch compatible display, presence of a three-dimensional display, presence of a projector, presence of an external video output port, presence of a trackball, presence of a D-pad, presence of a microphone, presence of speakers, presence of a cellular voice radio, presence of a cellular data radio, type of cellular voice radio, type of cellular data radio, presence of a Bluetooth radio, version of Bluetooth radio, presence of a Wi-Fi radio, type of Wi-Fi radio, presence of an accelerometer, presence of a gyroscope, presence of a Global Positioning System, presence of a front-facing camera, megapixel value of a camera, presence of a particular installed operating system, version of installed operating system, presence of a particular device driver, presence of a particular software library, and use of a particular mobile carrier.

23. The system of claim 14, wherein said mobile device resource comprises a plurality of mobile device resources such that it is determined whether that that plurality of mobile device resources, in combination, are correlated with an increased likelihood of the mobile device application failing to operate properly.

24. The system of claim 14, wherein the analysis system is configured to begin automatically analyze the crash report at least in part on at least one of (1) a time interval, (2) the number of crash reports received, (3) the number of crash reports received within a certain timeframe, (4) the number of crash reports received for an mobile device application, and (5) the number of crash reports received for a mobile device application relative to the number of copies of the mobile device application which have been transferred to users.

25. The system of claim 14, wherein the analysis system is configured automatically analyze the crash data by assigning weight values to crash data, said weight values affecting the likelihood of detecting a correlation between said device resource and said mobile device application failing to operate properly.

26. The system of claim 25, wherein said weight values relate to at least one of (1) the severity of the failure to operate properly, (2) the type of user device application which failed to operate properly, (3) when the failure to operate properly occurred, and (4) the mobile device on which the mobile device application failed to operate properly.

* * * * *